US011853370B2

(12) United States Patent
Santiago

(10) Patent No.: US 11,853,370 B2
(45) Date of Patent: Dec. 26, 2023

(54) SCENE AWARE SEARCHING

(71) Applicant: TIVO CORPORATION, San Jose, CA (US)

(72) Inventor: Carlos Santiago, Aurora, CO (US)

(73) Assignee: TiVo Corporation, San Jose, CA (US)

(*) Notice: Subject to any disclaimer, the term of this patent is extended or adjusted under 35 U.S.C. 154(b) by 0 days.

(21) Appl. No.: 17/975,176

(22) Filed: Oct. 27, 2022

(65) Prior Publication Data

US 2023/0185862 A1 Jun. 15, 2023

Related U.S. Application Data

(63) Continuation of application No. 16/846,630, filed on Apr. 13, 2020, now Pat. No. 11,514,112, which is a continuation of application No. 15/859,131, filed on Dec. 29, 2017, now Pat. No. 10,628,501.

(60) Provisional application No. 62/516,529, filed on Jun. 7, 2017.

(51) Int. Cl.
| G06F 7/00 | (2006.01) |
| G06F 16/951 | (2019.01) |
| G06N 5/022 | (2023.01) |
| H04N 21/84 | (2011.01) |
| H04N 21/482 | (2011.01) |
| G06F 16/783 | (2019.01) |
| H04N 21/439 | (2011.01) |
| H04N 21/44 | (2011.01) |

(52) U.S. Cl.
CPC ......... *G06F 16/951* (2019.01); *G06F 16/783* (2019.01); *G06N 5/022* (2013.01); *H04N 21/4394* (2013.01); *H04N 21/44008* (2013.01); *H04N 21/4828* (2013.01); *H04N 21/84* (2013.01)

(58) Field of Classification Search
CPC ..... G06F 16/951; G06F 16/783; G06N 5/022; H04N 21/4394; H04N 21/44008; H04N 21/4828; H04N 21/84
USPC .................................................. 707/600–899
See application file for complete search history.

(56) References Cited

U.S. PATENT DOCUMENTS

| 2010/0205203 A1 | 8/2010 | Anderson et al. |
| 2017/0147579 A1 | 5/2017 | Foerster et al. |
| 2018/0184257 A1* | 6/2018 | Proctor ................. G06F 16/951 |
| 2018/0246964 A1 | 8/2018 | Teichman et al. |
| 2018/0357317 A1 | 12/2018 | Santiago |

* cited by examiner

*Primary Examiner* — Isaac M Woo
(74) *Attorney, Agent, or Firm* — Haley Guiliano LLP

(57) ABSTRACT

Novel tools and techniques are provided for scene aware searching. A system may include a media player configured to play a video stream, a database, and a server configured to host an artificial intelligence (AI) engine. The server may further include a processor and a non-transitory computer readable medium comprising a set of instructions that, when executable by the processor to receive, from the media device, a search query from a user. The AI engine may further be configured to obtain the video stream associated with the search query, identify one or more objects in the video stream, derive contextual data associated with the one or more objects, identify one or more matches based on the contextual data, and determine a result of the search query.

20 Claims, 6 Drawing Sheets

SCENE AWARE SEARCHING

CROSS-REFERENCE TO RELATED APPLICATIONS

This application is a continuation of U.S. patent application Ser. No. 16/846,630, filed Apr. 13, 2020, which is a continuation of U.S. patent application Ser. No. 15/859,131, filed Dec. 29, 2017, (now U.S. Pat. No. 10,628,501), which claims the priority of U.S. Patent Provisional Application No. 62/516,529, filed Jun. 7, 2017, the disclosures of each application are incorporated by reference in their entireties.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for context aware searching, and, more particularly, to methods, systems, and apparatuses for implementing an AI engine to search for content contained within one or more frames of a video stream.

BACKGROUND

Existing multimedia devices treat general search queries as operations outside the context of the main audio/video operation a viewer may be streaming at the time. Further, existing multimedia devices are unable to determine that a user has initiated a search query regarding the audio/video that is currently being played. Additionally, some multimedia applications provide aggregated complementary details limited to a movie, TV, actor, and related information during the replay of an audio/video transmission that a user can reveal using info-like buttons or commands. However, none of these multimedia devices search for content associated with the audio/video currently being streamed in response to a search query by a user.

Hence, there is a need for more robust and scalable solutions for implementing an artificial intelligence ("AI") engine to search for content of a video stream, and, more particularly, for implementing an AI engine to search for content contained within one or more frames of a video stream.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
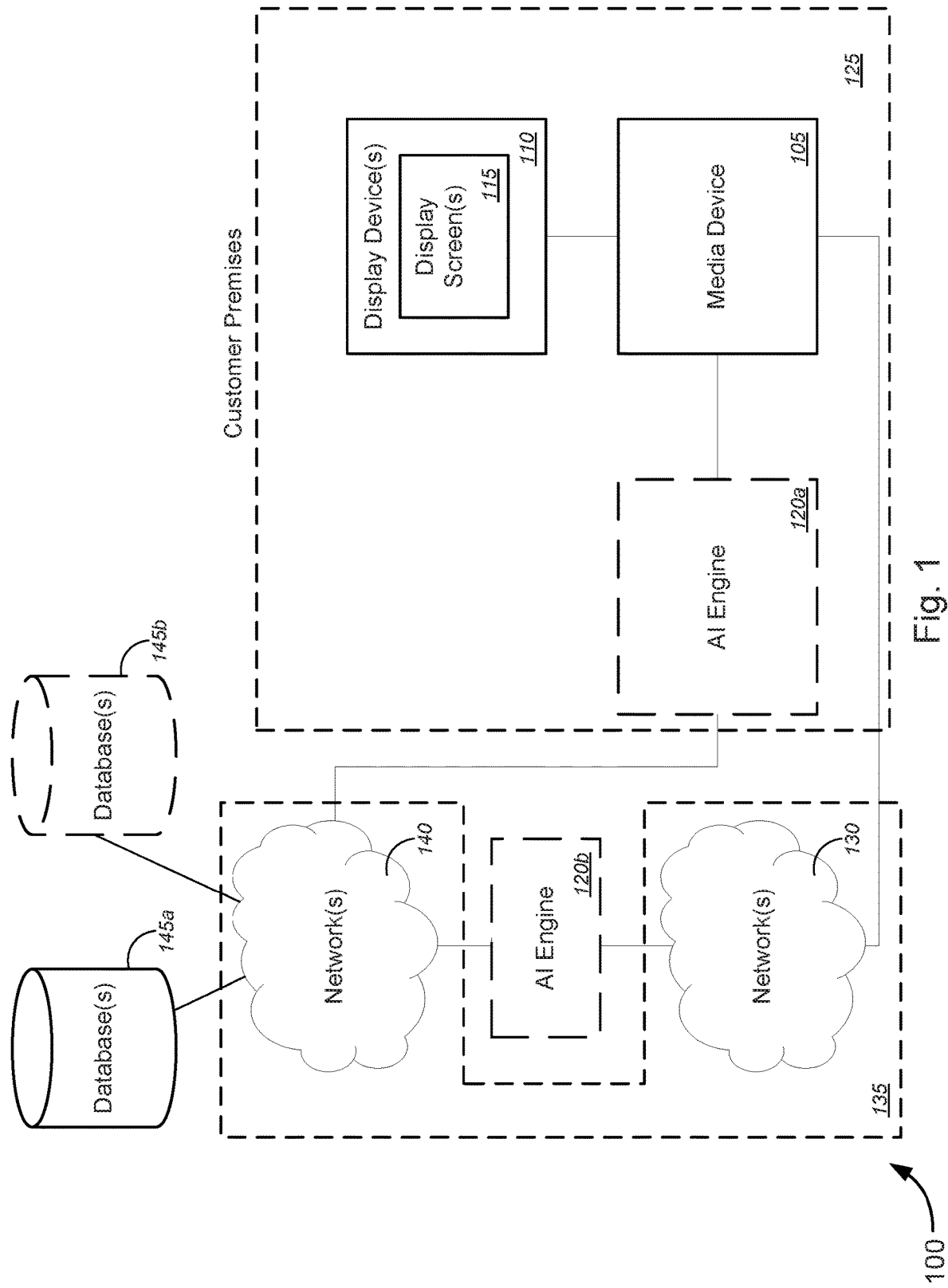
FIG. 1 is a schematic diagram illustrating a system for scene aware searching, in accordance with various embodiments.

Various embodiments provide tools and techniques for scene aware searching, and, more particularly, methods, systems, and apparatuses for implementing an AI engine to search for content contained within one or more frames of a video stream.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, video content streaming, searching technology, etc. In other aspects, certain embodiments, can improve the functioning of user equipment or systems themselves (e.g., video content streaming, searching systems, etc.), for example, by receiving, with an artificial intelligence ("AI") engine, a search query from a user; determining, with the AI engine, whether the search query by the user is related to one or more frames contained within a video stream; based on a determination that the search query is related to the one or more frames contained within the video stream, analyzing, with the AI engine, the one or more frames of the video stream to determine a context of the one or more frames; deriving, with the AI engine and based on the analysis of the one or more frames, contextual data from the one or more frames based at least in part on the context of the one or more frames of the video stream; searching, with the AI engine, a database for the search query based at least in part on the search query and based at least in part on the contextual data derived from the context of the one or more frames; receiving, with the AI engine and from the database, a result of the search query; etc. In particular, to the extent any abstract concepts are present in the various embodiments, those concepts can be implemented as described herein by devices, software, systems, and methods that involve specific novel functionality (e.g., steps or operations), such as, receiving, with an AI engine, a search query from a user; determining, with the AI engine, whether the search query by the user is related to one or more frames contained within a video stream; based on a determination that the search query is related to the one or more frames contained within the video stream, analyzing, with the AI engine, the one or more frames of the video stream to determine a context of the one or more frames; deriving, with the AI engine and based on the analysis of the one or more frames, contextual data from the one or more frames based at least in part on the context of the one or more frames of the video stream; searching, with the AI engine, a database for the search query based at least in part on the search query and based at least in part on the contextual data derived from the context of the one or more frames; receiving, with the AI engine and from the database, a result of the search query; etc., to name a few examples, that extend beyond mere conventional computer processing operations. These functionalities can produce tangible results outside of the implementing computer system, including, merely by way of example, displaying search results associated with video content to a user and/or navigating through video content based on a search query from a user.

In an aspect, a method may be provided. The method may include receiving, with an artificial intelligence (AI) engine, a search query from a user. The method may continue by identifying, with the AI engine, one or more objects in a video stream associated with the search query. The method continues by deriving, with the AI engine, contextual data associated with the one or more objects, and identifying, with the AI engine, one or more matches based on a search for the contextual data. The one or more matches may be entries in one or more data lakes of a database. The method continues by determining, with the AI engine, a result of the search query.

In another aspect, an apparatus may include at least one processor, and a non-transitory computer readable medium in communication with the at least one processor. The non-transitory computer readable medium may have stored thereon computer software comprising a set of instructions that, when executed by the at least one processor, causes the at least one processor to receive, via a media device, a search query from a user. The instructions may further be executable to obtain a video stream associated with the search query, identify one or more objects in the video stream associated with the search query, and derive contextual data associated with the one or more objects. The apparatus may further comprise instructions executable to identify, via a database, one or more matches based on a search for the contextual data. The one or more matches may be entries in one or more data lakes of the database. The instructions may further be executable to determine a result of the search query.

In an additional aspect, a system may be provided. The system may include a media player configured to play a video stream, a database coupled to a plurality of media players including the media player, and a server. The database may be configured to host one or more data lakes comprising a collection of one or more data streams from each of the plurality of media players. The server may be configured to host an AI engine, and be coupled to the media player via a network. The server may further include at least one processor, and a non-transitory computer readable medium in communication with the at least one processor. The non-transitory computer readable medium may have stored thereon computer software comprising a set of instructions that, when executed by the at least one first processor, causes the at least one first processor to receive, from the media device, a search query from a user. The instructions may further be executable to obtain the video stream associated with the search query, identify, via the AI engine, one or more objects in the video stream associated with the search query, and derive, via the AI engine, contextual data associated with the one or more objects. The AI engine may further be executable to identify, via a database, one or more matches based on a search for the contextual data, wherein the one or more matches are entries in the one or more data lakes of the database, and determine a result of the search query.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing video encoding and decoding, and, more particularly, to methods, systems, and apparatuses for implementing detection and visual enhancement of video encoding artifacts, as referred to above. The methods, systems, and apparatuses illustrated by FIGS. 1-6 refer to examples of different embodiments that include various components and steps, which can be considered alternatives, or which can be used in conjunction with one another in the various embodiments. The description of the illustrated methods, systems, and apparatuses shown in FIGS. 1-6 is provided for purposes of illustration and should not be considered to limit the scope of the different embodiments.

FIG. 1 is a schematic diagram illustrating a system 100 for scene aware searching (e.g., for content contained within one or more frames of a video stream), in accordance with various embodiments. The system 100 may include a media device 105, one or more display devices 110 including display screen(s) 115, an on-premises AI engine 120a and remote AI engine 120b (collectively referred to as the AI engines 120), customer premises 125, network 130, network 140, and database(s) 145*a*, 145*b* (collectively referred to as the databases 145).

In various embodiments, the media device 105 may be coupled to one or more display devices 110, which may include display screen(s) 115. The media device 105 may further be in communication with an AI engine 120, such as an on-premises AI engine 120*a*, or alternatively a remote AI engine 120*b* via network 130. Thus, in some embodiments, the media device 105 may be coupled to, or alternatively be configured to include AI engine 120*a*. In some embodiments, the media device 105 may be coupled to the AI engine 120*b* via network 130. The on-premises AI engine may be coupled to one or more databases 145 via a network 140. Similarly, the remote AI engine 120*b* may be coupled to one or more databases 145 via the network 140. It should be noted that the system 100 and its components are schematically illustrated in FIG. 1, and that modifications to the system 100 and its architecture may be possible in accordance with various embodiments.

In some embodiments, the system 100 may comprise a media device 105. The media device 105 may include, but is not limited to, one of a set-top box ("STB"), a media device, a gaming console, a server computer, a desktop computer, a laptop computer, a smartphone, a tablet, a digital versatile disc or digital video disc ("DVD") player, a Blu-ray disc ("BD") player, a digital video recording ("DVR") device, a streaming video player, a streaming music player, or a streaming game player, and/or the like. The media device 105 may be configured to receive and/or provide a video stream. The video stream may include, without limitation, a movie, a television show, or a live television show.

In various embodiments, the system 100 may further include one or more display devices 110, which may further include a display screen(s) 115. The one or more display devices 110 may include, but are not limited to, at least one of one or more monitors (e.g., computer monitor, laptop monitor, tablet screen, or phone screen) or one or more television sets (e.g., smart television sets or other television sets). In some examples, the one or more display devices 110 may be incorporated into the one or more media devices 105. Additionally, and/or alternatively, at least one of the one or more display devices 115 may be separate from the media device 105. The media device 105 may be communicatively coupled to each of the one or more display devices 110 via at least one of a wireless connection and/or a wired connection. The one or more display devices 110 may be configured to display a video stream received from the media device 105.

In various embodiments, the media device 105 may receive user input from a user (in various embodiments, receiving touch input from the user via a touchscreen display; in some embodiments, receiving voice input from the user via a voice interface device; in some instances, receiving gesture input from the user via a gesture interface device; in some cases, receiving physical user input from the user via one or more physical actuators; in additional embodiments, receiving remote control input via a remote control interface device; etc.).

In various embodiments, system 100 may further include an AI engine 120. The AI engine 120 may include, without limitation, a software program (e.g., a software agent), application, logic, or other tool residing on the customer premises or at a remote network location. In some embodiments, the AI engine 120*a* may be configured to be located in a customer premises 125. In some examples, the media device 105 may be configured to include the AI engine 120*a*.

In further embodiments, the AI engine 120*a* may be a standalone device, or configured to run on a device such as a server or other user device of the customer premises 125. For example, suitable user devices may include, without limitation, a smartphone, tablet device, personal computer (including laptop or desktop computers), a television, a gateway device (such as a modem, router, access point, or other network device), audio/video (A/V) receiver, or other suitable computing device. In some additional embodiments, the AI engine 120 may be a remote AI engine 120*b*, located off the customer premises 125. Accordingly, in some embodiments, the AI engine 120*b* may reside in a network accessible server to which the media device 105 may be configured to be coupled to via a network, such as network 130. Accordingly, in various examples, the AI engine 120 might be communicatively coupled to the media device 105 via a wired and/or wireless connection.

In some embodiments, the media device 105, the one or more display devices 110 (including the display screen(s) 115), and the AI engine 120*a* may be disposed within a customer premises 125, which may be one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, and/or the like. Alternatively, the AI engine 120*b* may be remotely located, and communicatively coupled to media device 105 via network(s) 130, 140 (collectively networks 135). For example, in some embodiments, network(s) 135 may be a service provider network and the AI engine 120 may be incorporated into one or more servers, network devices, appliances, or other computer devices on the service provider network. AI engine 120*b* may correspond to multiple users at multiple customer premises.

In some instances, system 100 may further include one or more databases 145*a* and 145*b* (collectively, databases 145). In some embodiments, databases 145 may include, without limitation, relational databases configured to store, organize, and manage access to large data lakes and/or non-relational (e.g., NoSQL) databases configured to store, organize, and manage access to large data lakes. Data lakes may include, without limitation, data streams gathered from a plurality of customer devices, such as media device 105, and inputs from other users and user devices of the customer premises 125. Accordingly, databases 145 may be communicatively coupled to the AI engine 120 via one or more networks 140. The databases 145 may be adapted to store, update, and retrieve data in response to SQL-formatted commands. Each database 145 may be accessible by the AI engines 120.

In various embodiments, the media device 105 may be configured to receive a search query from a user. The media device 105 may be configured to receive the search query in various ways, including without limitation, touch input from the user via a touchscreen display; through voice input from the user via a voice interface device; through gesture input from the user via a gesture interface device; through physical user input from the user via one or more physical actuators; or through remote control input via a remote control interface device. In various embodiments, a search query from the user may be related to a scene displayed on the screen. For example, the search query may be associated with a video stream and/or one or more frames of the video stream. The search query may, for example, include requests for contextual data regarding an object in a scene (e.g., what is played (either or both audio and video) during a scene and/or segment of the video stream). For example, the requests may include, but are not limited to, a request to identify one or more objects contained within the one or more frames of the video stream, a request for information associated with the one or more objects contained within the one or more frames of the video stream, a request to purchase the one or more objects contained within the one or more frames of the video stream, a request to identify a location of one or more objects contained within the one or more frames of the video stream, a request for directions to the one or more objects contained within the one or more frames of the video stream, a request for historical information about the one or more frames of the video stream, or a request for a menu of the one or more objects contained within one or more frames of the video stream. Accordingly, the one or more objects contained within the one or more frames of the video stream may include at least one of a person, inanimate objects such as a book, painting, products, an article of clothing, or a piece of furniture, a landmark, a location (such as a city, country, or region), a building, a landscape, place of interest, or place of business (e.g., restaurants). In further embodiments, the one or more objects may relate to audible objects, such as sounds, voices, songs, radio broadcasts, dialogs, melodies, and tones.

In various embodiments, determining whether a search query is associated with a scene in the video stream may further include parsing, with the media device 105 and/or AI engine 120, the search query via speech and/or text analysis to determine, without limitation, keywords, phrases, and commands. In various embodiments, the media device 105 may be configured to transmit the search query to an AI engine 120, such as an on-premises AI engine 120*a*, or remote AI engine 120*b*, or alternatively to perform an analysis (e.g., textual, speech to text, etc.) of the search query.

In various embodiments, the AI engine 120 may be configured to receive the search query initiated by the user from the media device 105. Additionally, in some embodiments, the AI engine 120 may be configured to receive information regarding with the video stream and/or one or more frames of a video stream from the media device 105, or other media streaming server. A video stream, as used here, may refer to both a video content stream, audio content stream, or both. In some embodiments, the AI engine 120 may request or otherwise obtain the video stream and associated information, from the media device 105, or a media streaming server. For example, the information regarding the video stream may include, without limitation, the video stream itself, a frame stream (e.g., a stream of sequential image data), a segment of the video stream, an audio stream or audio segment, a closed captioning (CC) stream, and any associated metadata (e.g., electronic programming guide information, synopsis of plots, information about the media content such as actors, directors, production year, release year, country of origin, etc.). The information associated with the video stream and/or one or more frames of a video stream may further include, without limitation, a name of a program being watched by a user, a timestamp corresponding to when the user initiated the search in the program, or at least one of audio content, closed captioning content, and/or image content of the frames that were playing when a user initiated the search etc.

In some examples, information regarding the video stream may be transmitted based, at least in part, on a timestamp associated with when the user initiates the search query. For example, the user may initiate the search query at a first time. Accordingly, information regarding the video stream may include information within a threshold time of the first time. The threshold time, for example, may include a range of time from 1-10 seconds, less than 30 seconds, and less than 1 minute. In some embodiments, the information regarding the video stream may be limited to information within the threshold time before, after, or both before and after the first time when the search query was initiated. For example, the AI engine may obtain, without limitation, a video stream segment that includes audio and/or video data within the threshold time of the first time, a frame stream with images within the threshold time of the first time, CC stream data within the threshold time of the first time, or video stream metadata within the threshold time of the first time.

In some embodiments, the AI engine 120 may be configured to determine, based on the video stream information, contextual data regarding the one or more objects. In various embodiments, determination of contextual information may include, without limitation, image analysis of one or more frames of the frame stream, text processing of a CC stream, and audio processing of an audio stream. For example, image analysis may include, without limitation, identification of objects, generation of search keywords, and analysis of text and content within an image. Text analysis may include analysis of a CC stream for text and content related to an object. Audio processing may include speech to text conversion, and subsequent analysis of the text, song and melody identification, etc.

In some embodiments, the AI engine 120 may be configured to generate contextual data through real-time processing, or in other embodiments, by pre-preproces sing information regarding the video stream and the determining contextual data for various scenes, segments, and/or times in the video stream. In some embodiments, the real-time processing or pre-processing may occur automatically, while in other embodiments, real-time processing or pre-processing may occur upon request.

In various embodiments, the AI engine 120 may further be configured to search the one or more databases 145 based on the contextual data to return a set of results. The AI engine 120 may further be configured to determine one or more results of the set of results most relevant (e.g., closest neighbor, strongly connected components, etc.) to the one or more objects of the search query. In some further examples, the AI engine 120 may be configured to utilize historic search data (e.g., results for other similar search queries from the same user or different users). Thus, some of the stream processing may occur in-cloud leveraging crowd sourced data. For example, to determine relevant search results, the AI engine 120 may be configured to process the set of results by applying AI algorithms. For example, in some embodiments, the AI engine 120 may be configured to determine the search results by using, without limitation, a best fit algorithm, nearest neighbor algorithm, or finding strongly connected components. Once processed, the AI engine 120 may further be configured to receive feedback regarding the accuracy of the results, and updating one or more of the AI algorithms, data in the data lakes, and determination of contextual information. For example, feedback may include, without limitation, input from a user, such as the user originating the search query or an analyst, or an automated tool or program. In some further embodiments, the AI engine 120 may further be configured to implement one or more rules for determining the search results, and in some further embodiments, update the one or more rules based on the feedback.

Accordingly, in various embodiments, once the AI engine 120 obtains one or more results of the search query, the AI engine 120 may send the results of the search query to the media device 105. The result may then be displayed on the one or more display devices 110. In some embodiments, the user may be prompted, via the media device 105, to indicate the accuracy or the relevance of the search results, or to provide further feedback. Thus, in various embodiments, the AI engine 120 and/or media device 105 may be configured to recognize a question from the user as a search query. The AI engine 120 may then determine, based on the search query, contextual data to be searched. The AI engine 120 may further be configured to update its beliefs about the contextual data and/or the search results based on feedback received from a user, analyst, or automated tool.

In yet further embodiments, the AI engine 120 may be configured to link to applications (e.g., apps) running on the media device 105. Thus, the AI engine 120 may be configured to present app-based options based on one or more of the search query, or search results. For example, if a search query indicates a desire to order a food item displayed in the video stream, the AI engine 120 may be configured to identify the food item, based on contextual data, and to interface with an appropriate app to place an order for the identified food item. In various embodiments, the results of the search query may include identification of the linked application and other appropriate actions to be taken based on the search query and/or search results.

Figure 2:
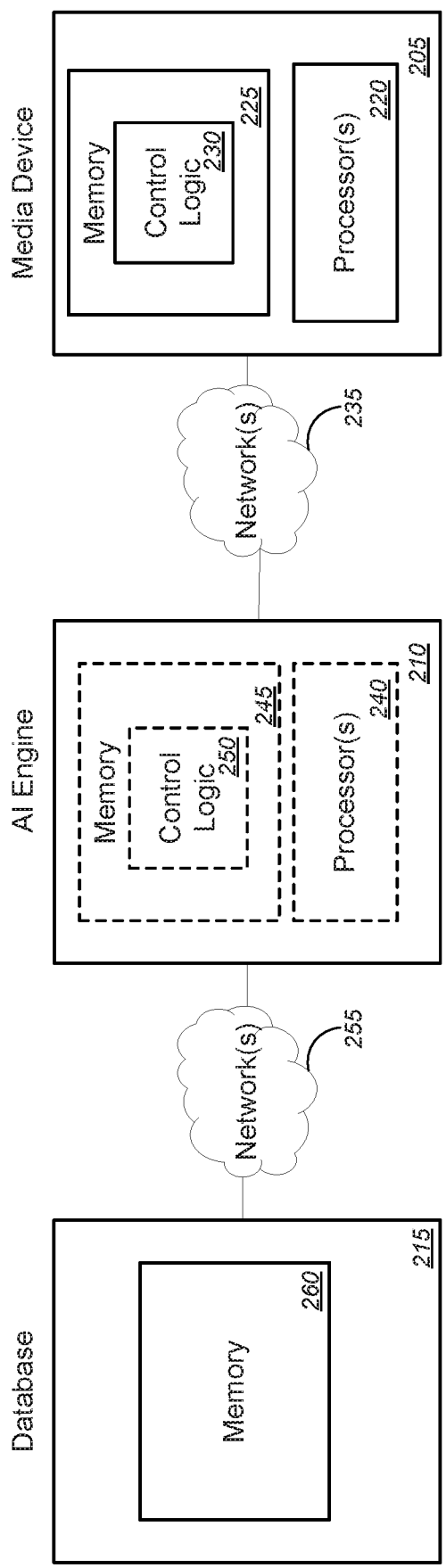
FIG. 2 is a functional block diagram illustrating a system for scene aware searching, in accordance with various embodiments.

FIG. 2 is a schematic block diagram illustrating a system 200 for searching for content contained within one or more frames of a video stream, in accordance with various embodiments. FIG. 2 may comprise a media device 205 (which may correspond to media device 105 of FIG. 1), an artificial intelligence ("AI") engine 210 (which may correspond to AI engine 120 of FIG. 1), and one or more databases 215 (which may correspond to databases 145 of FIG. 1). The various components of the media device 205 and the AI engine 210 of FIG. 2 may be incorporated within a single housing that encloses the entirety of the media device 205 and the AI engine 210; alternatively, the media device 205 and the AI engine 210 may include a plurality of components divided between two or more discrete housings. Moreover, while certain components of an exemplary media device 205, AI engine 210, and database 215 are illustrated by FIG. 2, the media device 205, AI engine 210, and database 215 may have one or more components of a general purpose computer system, as described below with respect to FIG. 5.

In some embodiments, the media device 205 may comprise one or more processor(s) 220, a memory 225, and control logic 230. The media device 205 may be configured to receive a video stream. The video stream may include, without limitation, a movie, a television show, or a live television show. As previously described, the media device 205 may be configured to receive a search query from a user. The search query may be at least one of an audio search query, a textual search query, or a touch search query.

In some embodiments, the media device 205 and/or AI engine 210 may further be configured to determine whether the search query is associated with a scene. For example, the media device 205 and/or AI engine 210 may be configured to analyze one or more frames of a frame stream currently being streamed by a user. In other embodiments, the media device 205 and/or AI engine 210 may be configured to analyze a segment of the video stream, audio stream, or other metadata with the search query. To determine whether the search query is associated with the scene, in some embodiments, the media device 205 and/or AI engine 210 may be configured to parse the search query (audio and/or textual) for keywords, phrases, and commands. The video stream may then be analyzed to identify objects, as previous described, based on the search query. In some examples, the keywords, phrases, and commands may be associated with, for example, people, inanimate object, products, articles of clothing, furniture, locations (such as cities or countries), buildings, landmarks, places of interest, places of business (such as restaurants), and may thus be linked to objects identified in the video stream.

In yet further embodiments, the media device 205 may be configured to detect a touch input by a user to determine that a user is requesting information about content contained within the video stream. For example, a user may touch an object in one or more frames of a video stream to indicate that the user wants additional information about that object. Additionally, and/or alternatively, the media device 205 may use a combination of textual, audio, and/or touch input to determine whether the search query is associated with one or more frames of the video stream currently being streamed by a user.

In some embodiments, the media device 205 may transmit the search query to an AI engine 210 to determine whether the search query is associated with the scene. As previously described, in some embodiments, to aid the AI engine 210 in determining whether the search query is associated with the scene, the media device 210 or a media content server may be configured to transmit the video stream and/or associated information, in some examples automatically or in response to a request from the AI engine 210. In one example, the media device 205 may send at least one of a name of a program being watched by a user, a timestamp corresponding to when the user initiated the search in the program, a video stream or segment, audio stream or segment, frame stream or segment, a closed captioning stream or segment, content, one or more images, and/or metadata. As previously described, in some examples, information regarding the video stream may be transmitted based, at least in part, on a timestamp associated with when the user initiates the search query. For example, the user may initiate the search query at a first time. Accordingly, information regarding the video stream may include information within a threshold time of the first time. The threshold time, for example, may include a range of time from 1-10 seconds, less than 30 seconds, and less than 1 minute. In some embodiments, the information regarding the video stream may be limited to information within the threshold time before, after, or both before and after the first time when the search query was initiated.

For example, in some embodiments, the media device 205 may send a predetermine number of one or more frames of the frame stream. The predetermined number of the one or more frames may be compiled from a first time (e.g., timestamp) when the search query is initiated by the user to a point in time prior to the first time when the search was initiated (e.g., threshold time). For example, the last 10 seconds (measured from when the search is initiated by the user) of frames may be compiled and analyzed by the AI engine 210. Thus, the media device 205 may send one or more frames that were played in the last 10 seconds. Alternatively, the AI engine 210 may request the predetermined number of frames based on the threshold time from media player 205 or a media content server (not shown).

In some embodiments, control logic 230 may be encoded and/or stored on a non-transitory computer readable storage medium, such as system memory 225 of media device 205.

Control logic 230 may include various non-transitory computer readable media executable by, for example, a processor 220 of the media device 205. The control logic 230 may include a plurality of computer readable instructions configured to be executable by the processor 220 to perform the various functions described above.

System 200 may further comprise AI engine 210. AI engine 210 may be incorporated into media device 205. Additionally, and/or alternatively, the AI engine may be separate from media device 205 and communicatively coupled to media device 205 via network(s) 235. The AI engine may include one or more processors 235, a memory 240, and control logic 245.

In various embodiments, the AI engine 210 may be configured to receive the search query from the media device 205 and the video stream and associated information from the media device 205 or a media content server. The AI engine 210 may then be configured to analyze the video stream and any associated information to identify one or objects related to the search query, as previously described. The AI engine 210 may further be configured to derive contextual data based on the one or more objects. In various embodiments, the AI engine 210 may be configured to determine contextual data by analyzing (sometimes in real time and/or near real time, or by pre-processing) the video stream and associated data, including at least one of image analysis of one or more frames of a frame stream, text processing, and audio processing. Accordingly, in various embodiments, the determination of contextual data may include identification of objects, such as people, inanimate object, such as products, articles of clothing, and furniture, locations, such as cities, countries, buildings, landmarks, places of interest, and places of business (such as restaurants). Determination of contextual data may further include identification of seasons, time of day, day of the week within the scene of the video stream, parsing of text, such as books, magazines, newspapers, flyers, advertisements, business signs, billboards, and road signs within the scene of the video stream, and the generation of keywords based on the analysis of the image frames. In further embodiment, the determination of contextual data may further include analysis of a closed captioning screen to determine the text of the dialog and context of the scene/video stream, and audio analysis to further parse spoken dialog, and to identify audio information, such as noises, sounds, voices, music, songs, melodies, and tones. Thus, contextual data may include searchable data, such as images, keywords, names, places, audio signals, names of songs, and other information determined, by the AI engine 210, to be related to the search query (or alternatively, contextual information regarding the objects related to the search query).

For example, in some embodiments, the AI engine 210 may analyze audio content to determine a context of the scene. For example, the AI engine 210 may analyze at least one of one of one or more words or a context of the audio content of the scene of the video stream to determine the context of the scene of the video stream. The AI engine 210 may then derive contextual data from the video stream based at least in part on the scene itself. Thus, in this example, the contextual data may include one or more keywords, voice identifications, audio signals, sounds, songs, music, and tones generated from the one or more words and/or context of the audio content. For example, if a person in a scene is talking about skiing, the AI engine 210 may determine that the person is at a ski resort, during the winter. In further examples, a person speaking may be identified based on voice identification (e.g., a character, actor, or actress), or a song identified.

In additional embodiments, the AI engine may further analyze CC content of a CC stream of the one or more frames of the video stream. For example, the AI engine 210 may analyze at least one of one of one or more words or a context of the closed captioning content of the one or more frames of the video stream to determine the context of the one or more frames of the video stream. The AI engine may then derive contextual data from the one or more frames based at least in part on determined the context of the one or more frames of the video stream. The contextual data may include one or more keywords derived from the one or more words or the context of the closed captioning content.

In further embodiments, the AI engine 210 may further analyze image content of the one or more frames of the video stream. For example, the AI engine 210 may analyze at least one of one or more images of the one or more frames of the video stream to determine the context of the one or more frames of the video stream. The AI engine 210 may identify one or more objects contained within the one or more frames of the video stream. For example, the AI engine 210, using an image analysis algorithm, may identify one or more objects, including without limitation, at least one of a person, inanimate objects such as a book, painting, products, an article of clothing, or a piece of furniture, a landmark, a location (such as a city, country, or region), a building, a landscape, place of interest, or place of business (e.g., restaurants). In further embodiments, the one or more objects may relate to audible objects, such as sounds, voices, songs, radio broadcasts, dialogs, melodies, and tones. Based on the one or more identified objects, the AI engine 210 may then derive contextual data from the one or more frames based at least in part on determined the context of the one or more frames of the video stream. The contextual data may include one or more images, one or more keywords, or a context associated with the one or more objects contained within the image content.

In some embodiments, the AI engine 210 may further analyze metadata content of the one or more frames of the video stream. In some embodiments, the metadata may be inserted in the video stream or be a separate file transmitted with the video stream. The AI engine 210 may analyze the metadata to determine the contextual data. For example, the metadata contained within the video stream may further include at least one of preprocessed data associated with the video stream. The preprocessed data may include information associated with at least one of frequent user searches associated with the video stream, or popular objects contained within the video stream. Additionally, and/or alternatively, the metadata may comprise at least one of a rating of the one or more frames of the video stream, one or more actors appearing within the one or more frames of the video stream, one or more products appearing within the one or more frames of the video stream, or one or more locations where the one or more frames of the video stream. The AI engine 210 may then derive contextual data from the one or more frames based at least in part on the determined context of the one or more frames of the video stream.

Accordingly, the contextual data may be at least one of one or more keywords, one or more images of objects derived from the context (audio content, closed captioning content, image content, and/or metadata) of the one or more frames of the video stream, one or more audio signals, and other searchable contextual data. The AI engine 210 may then determine using the contextual data, derived from the video stream and associated information, to search a database 215 for an answer (e.g., result) to the user's search query. As previously described, searching a database may include, without limitation, determining a set of the most relevant results based on a best fit algorithm, nearest neighbor algorithm, or a determination of strongly connected components within a data lake, matching the contextual data.

After determining an answer/result to the user's search query based on the contextual data and the search query. The AI engine 210 may be configured to present the result of the search query, in some examples via the media device 205 to display on a display screen. The AI engine 210 may further be configured to receive feedback from the media device 205 regarding the quality/accuracy of the search result. The feedback may be from a user input indicating the quality and/or accuracy of the result. Additionally, and/or alternatively, the media device 205 and/or AI engine 210 may track whether a user makes additional searches associated with the initial search query. This information may be used to assess quality/accuracy of the search result. For example, if the user makes additional searches, then the search result may be less accurate vs. if the user does not make any additional searches.

Control logic 230 may be encoded and/or stored on a non-transitory computer readable storage medium, such as system memory 225 of AI engine 210. Control logic 230 may include various non-transitory computer readable media executable by, for example, a processor 220 of the AI engine 210. The control logic 230 may include a plurality of computer readable instructions including one or more algorithms configured to be executable by the processor 220 to perform the various functions described above.

System 205 may further comprise one or more database(s) 215. In some embodiments, database(s) 215 may include, without limitation, relational databases configured to store, organize, and manage access to large data lakes and/or NoSQL databases configured to store, organize, and manage access to large data lakes. Database 215 may further comprise a memory 260, including a storage device configured to store and organize one or more data lakes. Accordingly, the one or more data lakes stored on the database 215 may include a collection of data from a plurality of data streams. Each of the plurality of data streams may be data obtained from the media devices and user devices of other users. Thus, in some embodiments, the data lake may be a large collection of crowd-sourced data. In various embodiments, the AI engine 210 may be configured to query the database 215 to derive contextual data, in addition to searching the database 215 based on the contextual data. In some embodiments, database 215 may update its relational models and/or other models based on feedback regarding the quality and/or accuracy of the search result.

Figure 3:
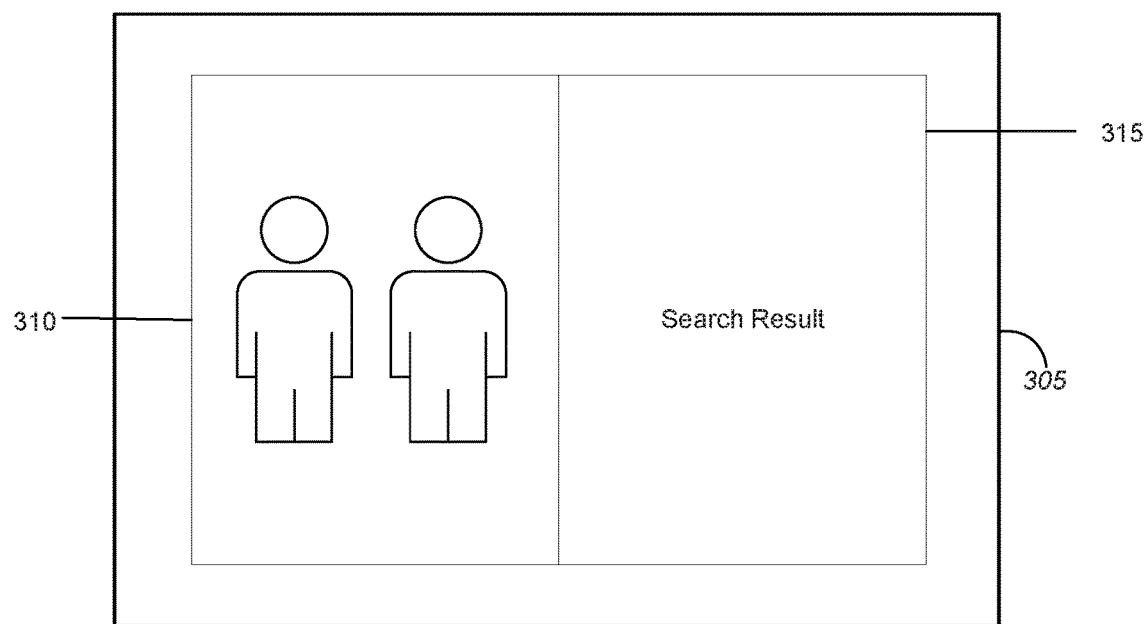
FIG. 3 is a schematic diagram of a user interface for displaying a result of a search content contained within one or more frames of a video, in accordance with various embodiments.

FIG. 3 is a schematic diagram illustrating a display 300 for displaying a result of a search content contained within one or more frames of a video, in accordance with various embodiments.

The display 300 of FIG. 3 may be configured to display a user interface (UI) 305, which further includes video content 310 and/or one or more search results 315 obtained from an AI engine (which may correspond to AI engine 120 of FIG. 1 and/or AI engine 210 of FIG. 2). The video content 310 may continue to be displayed while the AI engine searches for one or more results. Additionally, the one or more search results 315 may be displayed while the video content continues to be displayed on the display screen 305.

The one or more search results 315 that may be displayed on the UI 305 may include, without limitation, at least one of information identifying one or more objects contained within the one or more frames of the video stream, information associated with the one or more objects contained within the one or more frames of the video stream, an option to purchase the one or more objects contained within the one or more frames of the video stream, information identifying a location of the one or more objects contained within the one or more frames of the video stream, historical information about the one or more objects contained within the one or more frames of the video stream, directions to the one or more objects contained within the one or more frames of the video stream, or a menu associated with the one or more frames of the video stream. The one or more search results may cause at least one of an application or webpage to open and be displayed on the display screen 305. The one or more applications and/or webpages may give the user an option of purchasing the product, piece of clothing, or piece of furniture. The one or more search results may additionally cause the video stream to navigate to one or more frames indicated by a search query. In some embodiments, the UI 305 may further include a transparent heads-up display (HUD), which is configured to display the one or more search results 315 as a transparent overlay over the video content 310.

Figure 4:
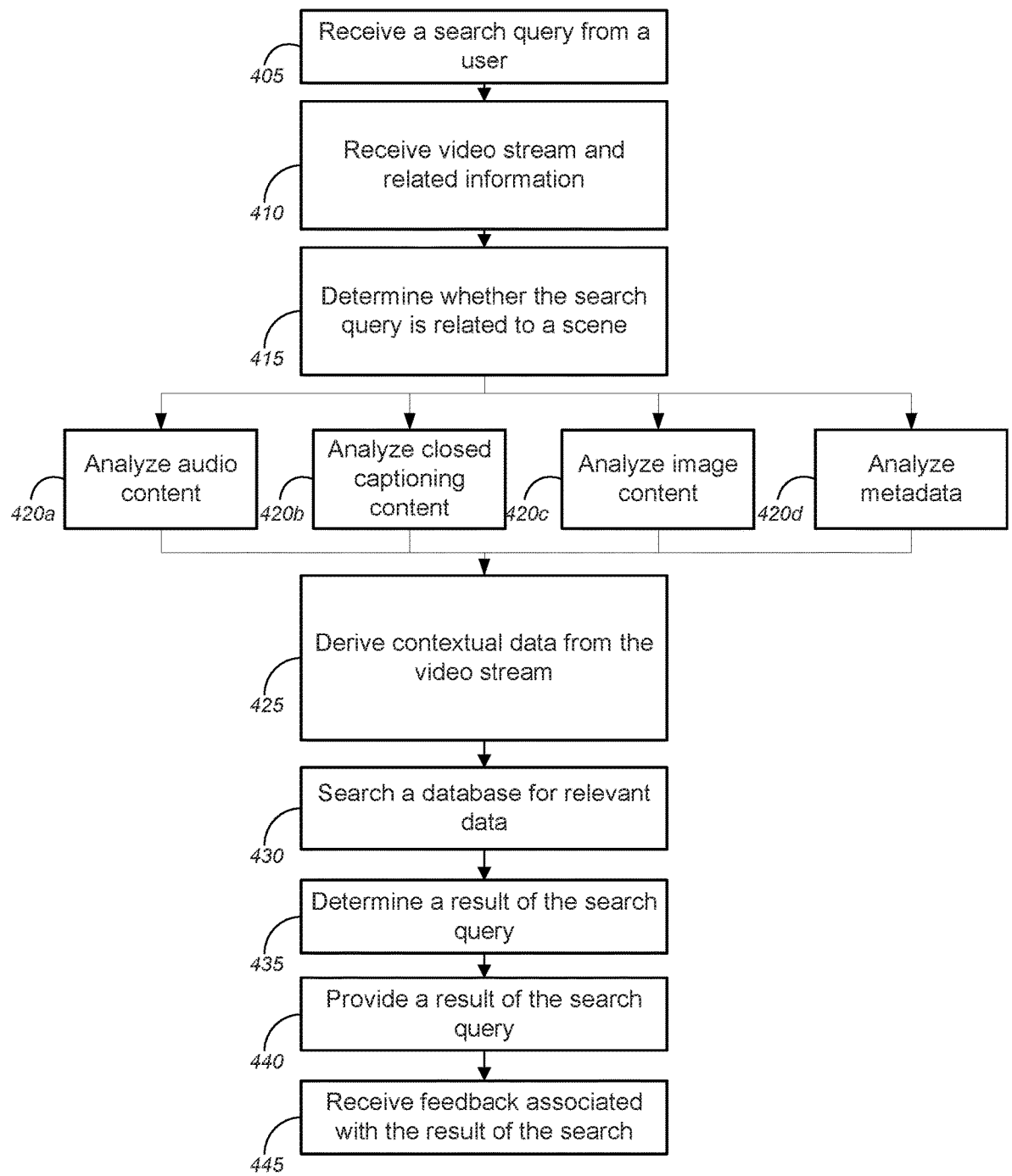
FIG. 4 is a flow diagram illustrating a method for scene aware searching, in accordance with various embodiments.

FIG. 4 is a flow diagram illustrating a method 400 for searching for content contained within one or more frames of a video stream, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems 100, 200, and 300 of FIGS. 1, 2, and 3, respectively (or components thereof), such methods may also be implemented using any suitable hardware (or software) implementation. Similarly, while each of the systems 100, 200, and 300 of FIGS. 1, 2, and 3, respectively (or components thereof), can operate according to the method 400 illustrated by FIG. 4 (e.g., by executing instructions embodied on a computer readable medium), the systems 100, 200, and 300 of FIGS. 1, 2, and 3 can each also operate according to other modes of operation and/or perform other suitable procedures.

The method 400 may begin, at block 405, by receiving a search query from a user. The search query may be received by at least one of a media device (which may correspond to media device 105 and/or media device 205) and/or an AI engine (which may correspond to AI engine 120 and/or AI engine 210). The search query may be associated with a video stream that the user is currently viewing. The video stream may be at least one of a movie, television show, or a live video broadcast. The search query by the user may include, without limitation, at least one of a request to identify one or more objects contained within the one or more frames of the video stream, a request for information associated with the one or more objects contained within the one or more frames of the video stream, a request to purchase the one or more objects contained within the one or more frames of the video stream, a request to identify a location of the one or more objects contained within the one or more frames of the video stream, or a request for historical information about the one or more frames of the video stream. Additionally, and/or alternatively, a user may request to navigate to a particular portion of the video content (e.g., a portion of the video stream where a product is first show, etc.).

The method 400, at block 410, may further include receiving a video stream and related information. As previously described, in some embodiments, an AI engine may be configured to receive the video stream and related information based on a timestamp associated with the search query. Information regarding the video stream may include the video stream itself or a segment, a frame stream or segment, an audio stream or segment, CC stream or segment, and any associated metadata. As previously described, the video stream and information regarding the video stream may only be sent within a threshold time of a time when the search query was initiated.

At block 415, the method 400 continues with determining whether the search query by the user is related to a scene of the video stream. For example, a media device and/or AI engine may determine whether the search query is related to one or more frames contained within the video stream. As previously described, to determine whether the search query is associated with the scene, the AI engine and/or media device may be configured to parse the search query to determine, without limitation, one or more keywords, phrases, and commands. In some further embodiments, the AI engine may be configured to further identify one or more objects in the video stream and associated information, and determine whether the one or more objects are related to the search query. In yet further embodiments, the AI engine may further determine whether a linked app should be executed based on the search query. For example, a search query indicating that an object shown in the frame of a video stream may cause the AI engine to instruct the media device or other user device to launch a related app (e.g., an app to order food, a shopping app, etc.).

In various embodiments, the method 400 may continue by determining contextual data regarding the search query and/or one or more objects. Accordingly, at blocks 420a-420d, the method 400 continues by analyzing audio content (block 420a), analyzing CC content (block 420b), analyzing image content (420c), and analyzing metadata (block 420d). The video stream may be analyzed in real-time and/or near real-time for a live video broadcast. An AI engine may be used to analyze the video stream to determine a context of the video stream. To determine the context of the one or more frames of the video stream, the AI engine may analyze a predetermined number of frames. The predetermined number of the one or more frames may be compiled from when the search query is initiated by the user to a point in time prior to when the search was initiated by the user. For example, the past 10 seconds (measured from when the user initiates the video stream) of video stream may be analyzed by the media device and/or AI engine. The predetermined number of frames may then be used to determine a context of the one or more frames. The context may include at least one of one or more people, one or more products, one or more articles of clothing, one or more pieces of furniture, one or more landmarks, one or more cities, one or more buildings, one or more restaurants, one or more landscapes, or one or more seasons included within the one or more frames.

At block 420a may analyze, with the AI engine, audio content (e.g., an audio stream) of the video stream. For example, the AI engine 210 may analyze at least one of one of one or more words or a context of the audio content of the one or more frames of the video stream to determine the context of the one or more frames of the video stream.

At block 420b, method 400 may include analyzing, with the AI engine, closed captioning content (e.g., a CC stream) associated with the video stream. For example, the AI engine 210 may analyze at least one of one of one or more words or a context of the closed captioning content of the one or more frames of the video stream to determine the context of the one or more frames of the video stream.

At block 420c, the method 400 may further include analyzing, with the AI engine, image content (e.g., one or more frames of a frame stream) of the one or more frames of the video stream. For example, the AI engine 210 may analyze at least one of one or more images of the one or more frames of the video stream to determine the context of the one or more frames of the video stream. The AI engine 210 may identify one or more objects contained within the one or more frames of the video stream. For example, the AI engine 210, using an image analysis algorithm, may identify one or more objects, which may include, at least one of a person, a product, an article of clothing, a piece of furniture, a landmark, a city, a building, a landscape, or a restaurant.

In some embodiments, method 400, at block 420d, may analyze, with the AI engine, metadata contained within or associated with the video stream. For example, the AI engine 210 may analyze the metadata contained within the one or more frames of the video stream to determine the context of the one or more frames of the video stream. The metadata contained within the video stream may be associated with at least one of preprocessed data associated with the video stream. The preprocessed data may include information associated with at least one of frequent user searches associated with the video stream or popular objects contained within the video stream. In some further examples, the metadata may comprise at least one of a rating of the content (e.g., a movie, television show, live broadcast, etc.) of the video stream, one or more actors appearing within the video stream or segment of the video stream (e.g., one or more frames of the video stream, or audio in the video stream segment), one or more objects appearing within the video stream, or one or more locations shown in the video stream.

Based on the foregoing analysis of at least one of the audio content, closed captioning content, image content, and/or metadata content, the method 400, at block 425, may derive, with the AI engine, contextual data relevant to the search query. In various embodiments, the AI engine may derive contextual data using at least one of the audio content, closed captioning content, image content, metadata content, and/or information contained within a database. The contextual data may include searchable data, such as, without limitation, images, keywords, names, places, audio signals, names of songs, and other information determined, by the AI engine to be related to the search query (or alternatively, contextual information regarding the objects related to the search query). For example, the contextual data may comprise one or more images of the skis a person is carrying, one or keywords associated with the skies, etc. In some further embodiments, the AI engine may then use the search query from the user to refine the contextual data that is searched for in a database. For example, if the search query by the user is where the actors skiing, then the contextual data about the skis may be eliminated. Alternatively, if the search query is about the skis then contextual data associated with the ski resort may be eliminated.

Method 400 may continue, at block 430, by searching, with the AI engine, a database for an answer to the search query. In some embodiments, this may include searching for one or more of keywords and information based on a parsing of the search query, and contextual data derived from the video stream and associated information. The AI engine may then, at block 435, determine a result to the user's search query. In various embodiments, the result may be determined, based at least in part on one of a best fit algorithm, nearest neighbor algorithm, or a determination of strongly connected components within a data lake of the database, of matches for the contextual data. At block 440, the method may continue by providing the result of the search query to a user. In some embodiments, the result may, for example, be a best-guess answer to a question asked by the user. In some further examples, the result/answer may include, without limitation, information identifying one or more objects contained within the scene of the video stream, information associated with the one or more objects contained within the scene of the video stream, an option to purchase the one or more objects contained within the scene frames of the video stream, information identifying a location of the one or more objects contained within the scene of the video stream, historical information about the one or more objects contained within the scene of the video stream, directions to the one or more objects contained within the scene of the video stream, or a menu associated with a restaurant shown the scene of the video stream. Additionally, and/or alternatively, a result of a search query may cause a media device and/or AI engine to navigate the video stream to a particular portion of the video stream requested by the user. If the object is a product, piece of clothing, or a piece of furniture, the media device and/or AI region may cause at least one of an application or webpage to open and give the user an option of purchasing the product, piece of clothing, or a piece of furniture.

Method 400, at block 445, may further include receiving, with the AI engine, feedback associated with the result of the search. The AI engine may receive feedback regarding the quality/accuracy of the search result. The feedback may be from a user input indicating the quality and/or accuracy of the result. Additionally, and/or alternatively, a media device and/or AI engine may track whether a user makes additional searches associated with the initial search query. This information may be used to assess quality/accuracy of the search result. The AI engine may use the information associated with the quality/accuracy of the search result to learn and refine future search queries by one or more users.

Exemplary System and Hardware Implementation

Figure 5:
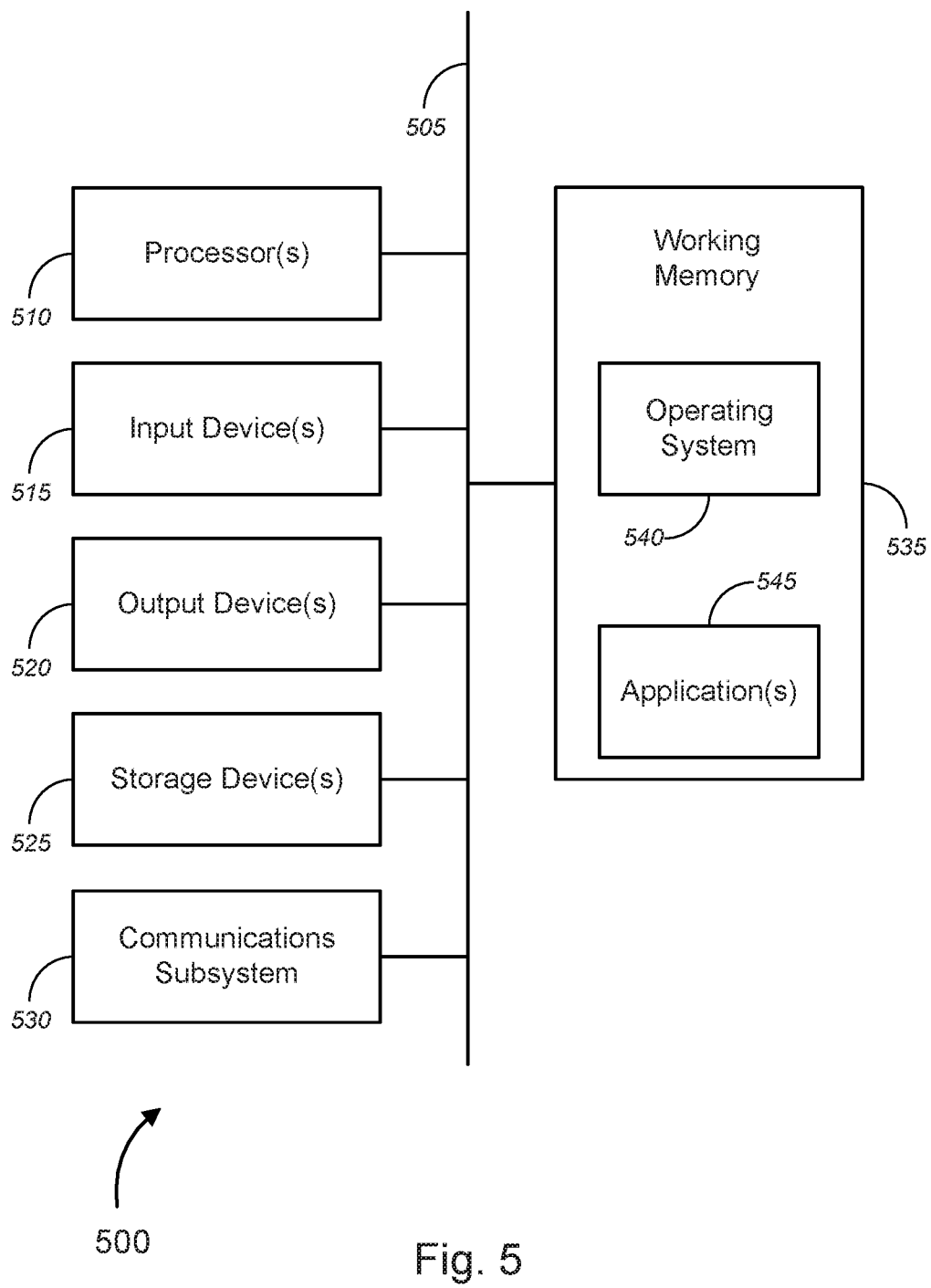
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., media devices 105, display devices 110, AI engine(s) 120, media devices 205, AI engine(s) 210, display devices 305, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which may represent an embodiment of the computer or hardware system (i.e., media devices 105, display devices 110, AI engine(s) 120, media devices 205, AI engine(s) 210, display devices 305, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 500 may also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code may be encoded and/or stored on a non-transitory computer readable storage medium, such as the storage device(s) 525 described above. In some cases, the storage medium may be incorporated within a computer system, such as the system 500. In other embodiments, the storage medium may be separate from a computer system (i.e., a removable medium, such as a compact disc, etc.), and/or provided in an installation package, such that the storage medium can be used to program, configure and/or adapt a general purpose computer with the instructions/code stored thereon. These instructions may take the form of executable code, which is executable by the computer or hardware system 500 and/or may take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) may also be used, and/or particular elements may be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which may be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 may cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media may be involved in providing instructions/code to processor(s) 510 for execution and/or may be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer may load the instructions into its dynamic memory and send the instructions as signals over a transmission medium to be received and/or executed by the computer or hardware system 500. These signals, which may be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then may carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
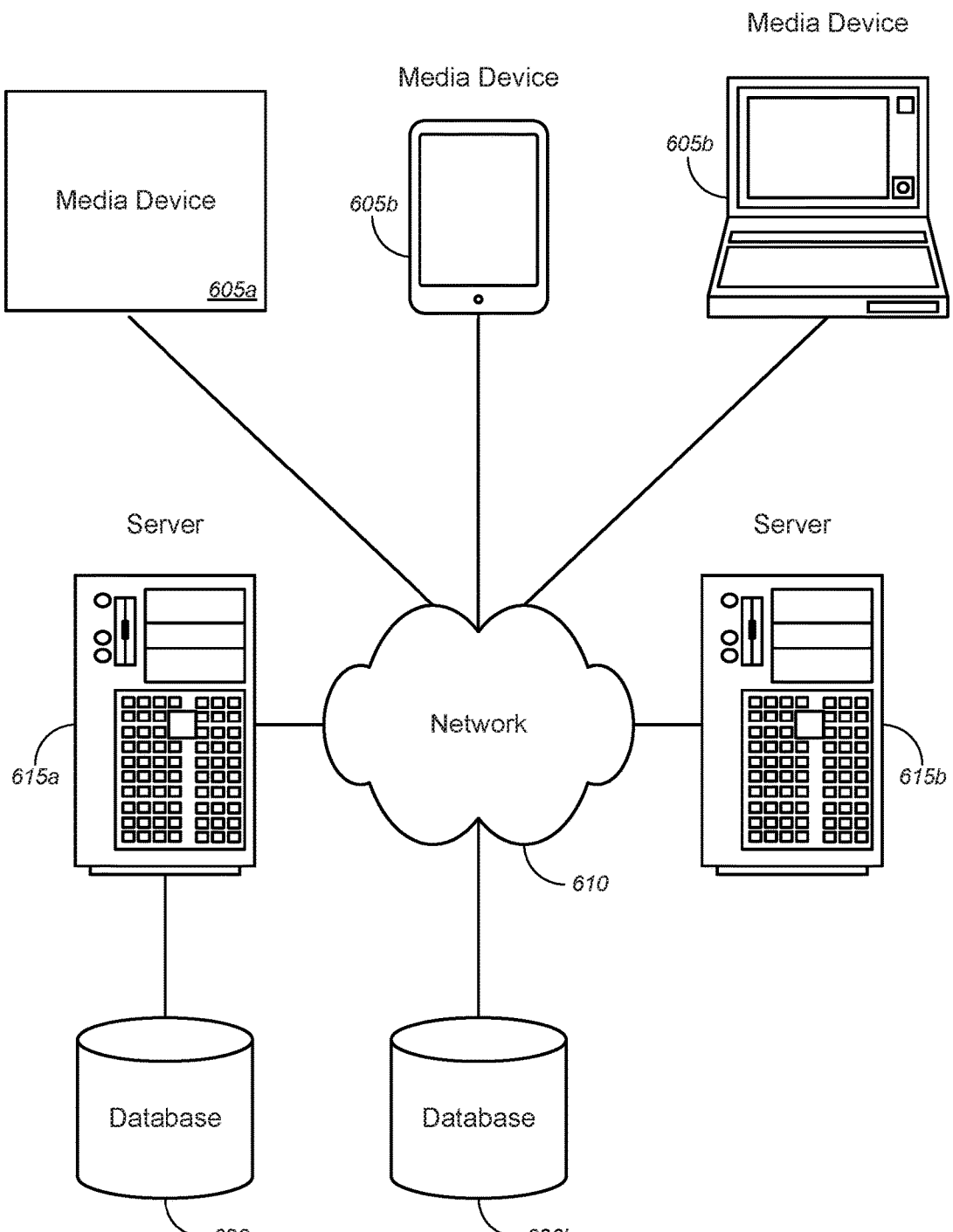
FIG. 6 is a block diagram illustrating a networked system of computers, computing systems, or system hardware architecture, which can be used in accordance with various embodiments.

As noted above, a set of embodiments comprises methods and systems for implementing an artificial intelligence ("AI") engine. FIG. 6 illustrates a schematic diagram of a system 600 that can be used in accordance with one set of embodiments. The system 600 can include one or more media devices 605 (which may correspond to media device 105 of FIG. 1 and/or media device 205 of FIG. 2) which may include one or more user computers, user devices, or customer devices 605. A media 605 can be a general purpose personal computer (including, merely by way of example, desktop computers, tablet computers, laptop computers, handheld computers, and the like), one of a set-top box ("STB"), a media device, a gaming console, a digital versatile disc or digital video disc ("DVD") player, a Blu-ray disc ("BD") player, a digital video recording ("DVR") device, a streaming video player, a streaming music player, or a streaming game player, cloud computing devices, a server(s), and/or a workstation computer(s) running any of a variety of commercially-available UNIX™ or UNIX-like operating systems. A media device 605 can also have any of a variety of applications, including one or more applications configured to perform methods provided by various embodiments (as described above, for example), as well as one or more office applications, database client and/or server applications, and/or web browser applications. Alternatively, a media device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with three media devices 605, any number of media devices 605 can be supported.

Certain embodiments operate in a networked environment, which can include a network(s) 610 (which may correspond to network(s) 130 and 140 of FIG. 1 or network(s) 235 and 255 of FIG. 2). The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network may include an access network of the service provider (e.g., an Internet service provider ("ISP")). In another embodiment, the network may include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615. Each of the server(s) 615 may include an AI engine (not shown, which may correspond to AI engine 120 of FIG. 1 and/or AI engine 210 of FIG. 2).

Merely by way of example, one of the servers 615 may be a data server, a web server, a cloud computing device(s), or the like, as described above. The data server may include (or be in communication with) a web server, which can be used, merely by way of example, to process (via an AI engine) requests for searches, web pages, or other electronic documents from media devices 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, may include one or more application servers, which can be configured with one or more applications accessible by a client running on one or more of the client computers 605 and/or other servers 615. Merely by way of example, the server(s) 615 can be one or more general purpose computers capable of executing programs or scripts in response to the media devices 605 and/or other servers 615, including, without limitation, web applications (which may, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a media device 605 and/or another server 615. In some embodiments, an application server can perform one or more of the processes for implementing an artificial intelligence ("AI") engine, as described in above. Data provided by an application server may be formatted as one or more web pages (comprising HTML, JavaScript, etc., for example) and/or may be forwarded to a user computer 605 via a web server (as described above, for example). Similarly, a web server may receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by the media devices 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a may reside on a storage medium local to (and/or resident in) a server 615a (and/or media devices 605). Alternatively, a database 620n can be remote from any or all of the computers 605, 615, so long as it can be in communication (e.g., via the network 610) with one or more of these. Each of the databases 620 may be configured to store one or more data lakes, as previously described. Each of the databases 620 may be accessible by an AI engine, or media device as previously described. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. In other embodiments, the database 620 may be a NoSQL database configured to store, organize, and manage access to large data lakes. The NoSQL database may include, without limitation, MongoDB, Redis, Cassandra, CouchDB, HBase, and/or other NoSQL databases. The database 620 may be controlled and/or maintained by a database server, as described above, for example.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, at an artificial intelligence (AI) engine, a first search query from a user;
   determining whether the first search query is related to a video stream that is currently being consumed by the user;
   in response to determining that the first search query is related to the video stream that is currently being consumed by the user: determining context related to the first search query, wherein the determination comprises analyzing one or more objects in a frame of the video stream currently being consumed by the user;
   refining, by the AI engine, the context determined based on the first search query in response to receiving a second search query, wherein the second search query is related to the first search query;
   identifying, by the AI engine, one or more matches based on the refined context, wherein the one or more matches are entries in one or more data lakes of a database; and
   displaying results of the identified matches.

2. The method of claim 1, further comprising:
   identifying that the frame of the video stream currently being consumed by the user includes a first and a second object, from the one or more objects;
   determining that the second search query identifies the first object; and
   in response to the determination, eliminating contextual data relating to the second object.

3. The method of claim 2, wherein refining the context determined based on the first search query includes, removing the second object from being considered in determining the refined context.

4. The method of claim 1, further comprising:
   identifying results of matches based on context determined for the first search query; and
   determining accuracy of the identified results based on the received second search query.

5. The method of claim 4, further comprising, using data collected based on the accuracy determination to refine future searches.

6. The method of claim 1, wherein the second search query identifies an object from the one or more objects in the frame of the video stream currently being consumed by the user.

7. The method of claim 1, further comprising: receiving, at the AI engine, the video stream and information associated to the video stream, wherein information associated to the video stream includes at least one of an audio stream, frame stream, closed captioning stream, and metadata.

8. The method of claim 1, wherein determining whether the first search query is related to the video stream that is currently being consumed by the user comprises analyzing a combination of textual, audio, and touch input.

9. The method of claim 1, wherein the first search query is related to a request to purchase the one or more objects in the frame of the video stream currently being consumed by the user.

10. The method of claim 1, wherein the first search query is related to identify a location of the one or more objects in the frame of the video stream currently being consumed by the user.

11. A system, comprising:
    a media player configured to play a video stream;
    a database coupled to a plurality of media players including the media player, the database configured to host one or more data lakes comprising a collection of one or more video streams from each of the plurality of media players;
    a server configured to host an artificial intelligence (AI) engine, the server coupled to the media player via a network, the server comprising:
    at least one processor;
    a non-transitory computer readable medium in communication with the at least one processor, the non-transitory computer readable medium having stored thereon computer software comprising a set of instructions that, when executed by the at least one first processor, causes the at least one first processor to:
    receive a first search query from a user;
    determine whether the first search query is related to a video stream that is currently being consumed by the user;
    in response to determining that the first search query is related to the video stream that is currently being consumed by the user: determine context related to the first search query, wherein the determination comprises analyzing one or more objects in a frame of the video stream currently being consumed by the user;
    refine the context determined based on the first search query in response to receiving a second search query, wherein the second search query is related to the first search query;
    identify one or more matches based on the refined context, wherein the one or more matches are entries in one or more data lakes of a database; and
    display results of the identified matches.

12. The system of claim 11, wherein the set of instructions further comprise instructions executable by the at least one processor to:
    identify that the frame of the video stream currently being consumed by the user includes a first and a second object, from the one or more objects;
    determine that the second search query identifies the first object; and
    in response to the determination, eliminate contextual data relating to the second object.

13. The system of claim 12, wherein refining the context determined based on the first search query includes, instructions executable by the at least one processor to remove the second object from being considered in determining the refined context.

14. The system of claim 11, wherein the set of instructions further comprise instructions executable by the at least one processor to:
- identify results of matches based on context determined for the first search query; and
- determine accuracy of the identified results based on the received second search query.

15. The system of claim 14, wherein the set of instructions further comprise instructions executable by the at least one processor to use data collected based on the accuracy determination to refine future searches.

16. The system of claim 11, wherein the second search query identifies an object from the one or more objects in the frame of the video stream currently being consumed by the user.

17. The system of claim 11, wherein the set of instructions further comprise instructions executable by the at least one processor to receive the video stream and information associated to the video stream, wherein information associated to the video stream includes at least one of an audio stream, frame stream, closed captioning stream, and metadata.

18. The system of claim 11, wherein determining whether the first search query is related to the video stream that is currently being consumed by the user comprises instructions executable by the at least one processor to analyze a combination of textual, audio, and touch input.

19. The system of claim 11, wherein the first search query is related to a request to purchase the one or more objects in the frame of the video stream currently being consumed by the user.

20. The system of claim 11, wherein the first search query is related to identify a location of the one or more objects in the frame of the video stream currently being consumed by the user.

* * * * *